Figure 1:
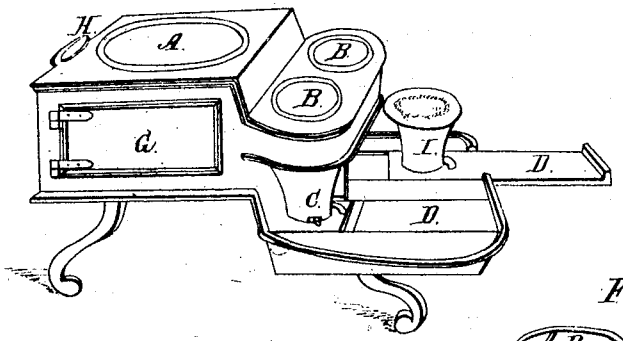
Figure 2:
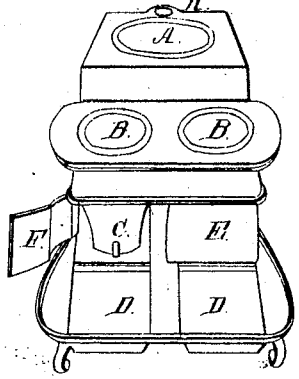
Figure 3:
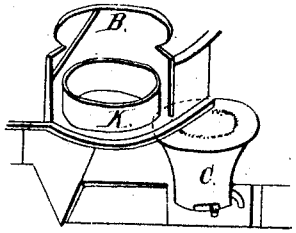

9889X

W. Parmalee,

Cook Stove.

Patented July 2. 1836.

MISSING PAGE TEMPORARY NOTICE

PATENT # 9889X FOR ISSUE DATE 7/2/1836 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text